Oct. 13, 1931. T. R. HARRISON 1,827,520
RECORDING AND CONTROL SYSTEM AND APPARATUS THEREFOR
Filed Nov. 1, 1926 2 Sheets-Sheet 1

Inventor
Thomas Randolf Harrison
William A. Strauch
By
Attorney

Oct. 13, 1931.  T. R. HARRISON  1,827,520
RECORDING AND CONTROL SYSTEM AND APPARATUS THEREFOR
Filed Nov. 1, 1926  2 Sheets-Sheet 2

Fig. 3

Inventor
Thomas Randolph Harrison
By William A. Strauch
Attorney

Patented Oct. 13, 1931

1,827,520

UNITED STATES PATENT OFFICE

THOMAS RANDOLPH HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

RECORDING AND CONTROL SYSTEM AND APPARATUS THEREFOR

Application filed November 1, 1926. Serial No. 145,583.

The present invention relates to improvements in automatic recording and control systems and apparatus therefor.

More particularly the invention relates to systems and apparatus for controlling recorders, switches, motors, valves, rheostats, and like devices in response to mechanical, chemical, electrical or other physical changes of conditions in order to make a record of the changes, or to maintain predetermined physical conditions at a controlled point or points, or both. The invention is especially useful in temperature recording and pyrometric control systems where it is desired to record the conditions of temperatures at one or more remote points, for example in furnaces or kilns, and to regulate or control, either manually or automatically, physical conditions at the controlled points.

Various recording and control systems and apparatus have heretofore been proposed for operations of the character mentioned, but the prior systems have been more or less inaccurate in operation, complicated in structure, lacking in durability, and easily disarranged. One well known type of prior system is provided with a control galvanometer operated by currents produced by variations in conditions at the controlled point or points. Periodically operating mechanical means have been provided, that push a control galvanometer pointer out of its normal plane of movement to actuate a control member. The movement required for dislocation of the pointer from its normal plane of movement and to actuate the control member introduces undue strains in the galvanometer and sufficiently heavy constructions must be utilized to withstand such strains. As a result the galvanometer cannot be made sufficiently sensitive in practical operation of such systems to effect sufficiently accurate actuation of the mechanism. Furthermore, during the period of actuation of the control member the galvanometer pointer is held against movement so that for a substantial period the galvanometer is prevented from assuming a new position in accordance with changes in physical conditions. Thus an adjustment must be made in a series of steps which is an excessively slow process for many practical applications. A primary object of the present invention is to provide a novel galvanometer control mechanism in which the use of a very sensitive galvanometer is permitted thus avoiding appreciable errors due to the necessary mechanical clearance which must be allowed in mechanisms. This is accomplished by eliminating the contacting mechanisms heretofore used and effecting the controls by utilization of means responsive to radiant energy to effect the control operations, avoiding mechanical strains from the galvanometer, thus permitting the use of more sensitive control springs and replacing the galvanometer pointer by a mirror having much lower moment of inertia thus increasing the speed of motion of the galvanometer coil.

A further disadvantage of prior contacting galvanometer recording and control instruments of the type mentioned is that due to periodic or cyclic operation, a substantial portion of each cycle must be utilized for restoration of the parts and the adjustments are made intermittently while small adjustments are inaccurately made and difficult to produce. Another object of the present invention is to provide a control mechanism in which adjustments are made independently of periodic or cyclic mechanisms, and in which finer adjustments of the mechanism may be made, and made more rapidly and without interruption, and a more stable mechanism is provided than heretofore available.

Still another object of the invention is to provide a simple mechanism of the character mentioned in which the adjustments are proportional to the variations in the condition under control, permitting an adjustment to be made rapidly and brought to a correct setting without over-shooting or hunting.

A further object of the invention is to provide a light sensitive control mechanism for making corrections that are in a direction corresponding to the direction of deviation of the controlled condition from a predetermined condition, and are made at a variable rate dependent upon the extent of deviation of the controlled condition from the predetermined condition, so that for greater deviations from the predetermined condition, corrections are more rapidly applied.

Further objects of the invention will appear in the following detailed disclosure of a preferred embodiment thereof, and are such as may be attained by a utilization of the various principles, combinations and sub-combinations as hereinafter set forth, and as are defined by the terms of the appended claims.

As shown in the drawings,

Figure 3 is a diagrammatic illustration showing the essential control circuits of the preferred embodiment of my invention.

Figure 1:
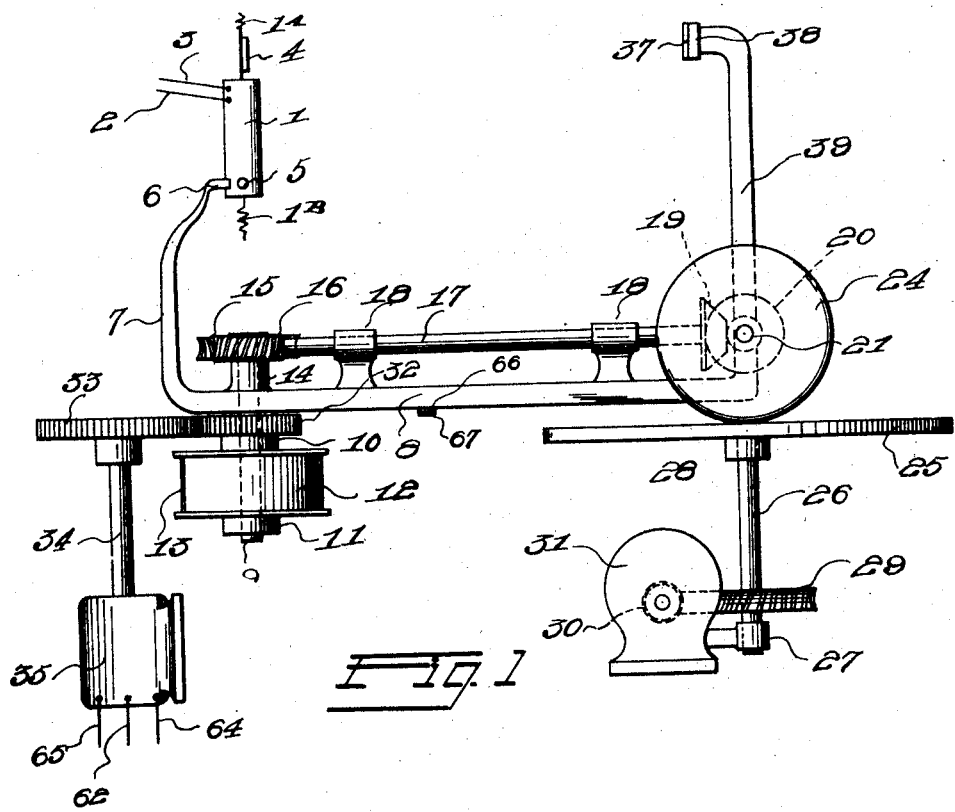
Figure 1 is a more or less diagrammatic illustration of the preferred form of my invention.

A control galvanometer of usual construction provided with the galvanometer coil 1 held in normal position by springs 1A and 1B, is connected to means, such for example as a thermocouple responsive to condition to be controlled in well known manner, and deviations of the condition under control from a predetermined value cause deflections of the coil 1 from its zero or normal position. Secured to and movable with the galvanometer coil 1 is a mirror 4 and extending from opposite sides of the galvanometer coil are the stop members 5 which limit the extent of deflection of the coil. The stops 5 are employed as a matter of practical convenience and are in no way inherently necessary to the operation of the device of this invention. They may be omitted. Stop members 5 are adapted to engage the ends of stop projections 6 which are formed integrally on upstanding support 7 of the control table 8. As will be described in detail hereinafter the control table 8 is rotated thereby moving the stop projection 6 to vary the limits between which the galvanometer may deflect. Control table 8 is journaled for rotation on spindle 9. Spindle 9 is supported by journals 10 and 11, and rigidly secured thereto is the recorder ribbon driving pulley 12 around which metallic recorder ribbon 13 passes. Spindle 9 extends through the boss 14 of the table 8, and has secured thereto and is driven by a worm wheel 15. Worm wheel 15 meshes with a drive worm 16 secured to and driven by a shaft 17. Shaft 17 in turn is supported from table 8 by the journals 18. Secured to the outer end of the shaft 17 is a bevel gear 19 which meshes with and is driven by a bevel gear 20. Gear 20 is in turn secured to and driven by a shaft 21 which is supported from the table 8 by means of the journals 22 and 23. Secured to and driving the shaft 21 is a friction disk 24 which normally contacts with the center of drive disk 25. Drive disk 25 is supported on the upper end of and driven by a shaft 26 which is suitably journaled at 27 and 28 and is driven by a worm wheel 29. Worm wheel 29 in turn is driven by a worm 30 which is driven by the continuously operating motor 31.

Rigidly secured to and driving table 8 is a gear 32 which is journaled for rotation on spindle 9 which meshes with and is driven by a gear 33. Gear 33 in turn is secured to and driven by the armature shaft 34 of a reversible motor 35. Reversible motor 35 is controlled by means of a circuit in which the current flow is varied in response to the variations in resistance of a pair of selenium cells 36 and 37 supported on panel 38. Panel 38 in turn is supported on and movable with the table 8 by means of the post 39. Selenium cells 36 and 37 are positioned to intercept a beam of light that is reflected from the mirror 4.

As shown in Figure 3 a source of light 40 is provided from which a light beam 41 passes through the converging lense arrangement 42 and is directed through a fixed screen 43 and focused on the center of the mirror 4 carried by the galvanometer coil 1. Beam 41 is reflected by mirror 4, passing through the plano-convex cylindrical lense 44 which condenses the beam in a vertical direction, and directs it on the selenium cells 36 and 37. Selenium cells 36 and 37 are connected in a Wheatstone bridge circuit. A terminal of cells 36 and 37 respectively are connected by means of conductors 45 and 46 through adjustable balancing resistances 47 and 48 to terminals of the batteries 49 and 50. Conductors 45 and 46 are connected together at junction point 51 so that the batteries 49 and 50 oppose each other, and connected to the point 51 by the conductor 52 is the coil 54 of a sensitive galvanometer relay. The opposite terminal of the coil 54 is connected by conductor 52 through an adjustable resistance 55 to the remaining terminals of the selenium cells 36 and 37 at the point 56. Coil 54 is provided with a contact arm 58 carrying a contact 59. Contact 59 is adapted to engage contacts 60 and 61 depending upon the direction of deflection of the coil 54 from the normal or zero position shown. Contact 59 is connected by means of the conductor 62 through a source of electrical energy 63 to the common terminal of reversing motor 35, while contacts 60 and 61 are connected to the remaining terminals of reversing motor 35 by means of conductors 64 and 65.

Figure 2:
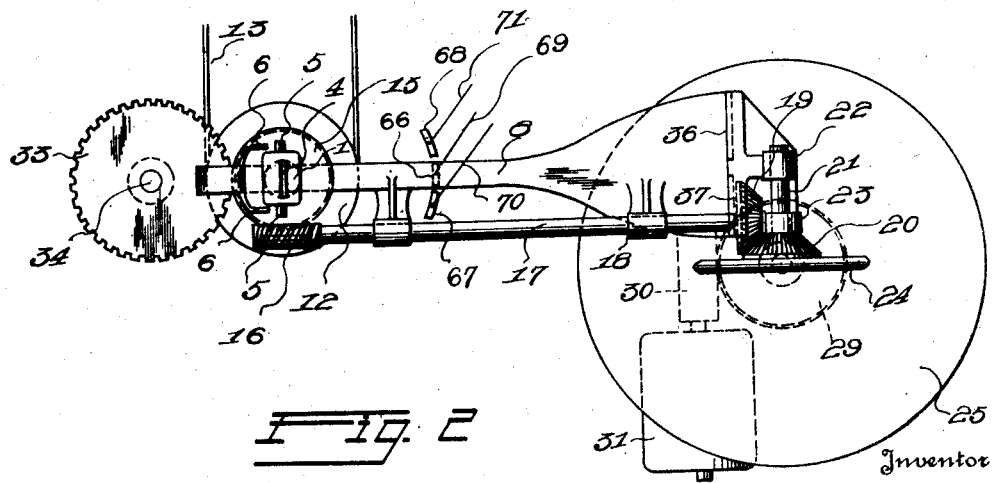
Figure 2 is a more or less diagrammatic plan view of the form of invention shown in Figure 1.

In operation of the device, drive disk 25 is rotated continuously by the motor 31. With the galvanometer coil 1 in normal or zero position beam 41 will rest equally on the selenium cells 36 and 37 balancing the bridge circuit and no current will flow in bridge connection of the Wheatstone bridge circuit comprising the galvanometer coil 54. Contact 59 will accordingly be out of engagement with contacts 60 and 61 and no energy will be supplied to motor 35, friction disk 24 will be in engagement with the center of the disk 25 as shown in Figure 2, and no rotation will be imparted thereto.

When a deflection of galvanometer coil 1 from normal occurs, mirror 4 will move with it, shifting the reflected light beam 41 so that the amount of light impinging upon the cells 36 and 37 will become unequal, varying the resistances thereof in well known manner. This will unbalance the Wheatstone bridge circuit, causing a current to flow through the conductors 52 and coil 54 in a direction depending upon the direction of deflection of the mirror 4 from normal, shifting arm 58 to bring contact 59 into engagement with contact 60 or contact 61, depending up the direction of deflection of coil 1 from zero position. Assuming the deflection is such as to cause contact 59 to engage the contact 60, an energizing circuit will be completed from the source of electrical energy 63 through contacts 59 and 60 and conductors 62 and 64 to reversing motor 35, starting the motor into rotation. Rotation of motor 35, rotates gear 32 which in turn causes the table 8 to rotate about spindle 9 in such a direction that the table 8 together with the selenium cells 36 and 37 will follow the beam 41 until it again falls equally on the selenium cells 36 and 37 balancing the bridge circuit. When the bridge circuit is balanced, coil 54 and arm 58 will be returned to normal position shown in Figure 3, interrupting the circuit between contacts 59 and 60.

As the galvanometer coil 1 restores to normal position, the beam of light will again be deflected causing unbalancing in the resistance of the selenium cells in the opposite direction so that current will flow through the coil 54 in an opposite direction causing contact 59 to engage the contact 61. This closes a circuit for motor 35 through conductor 62, source 63, and conductor 65, causing the rotation of motor 35 in a reverse direction rotating the table 8 towards its normal position shown in Figure 2. If coil 1 deviates from its normal position in an opposite direction, contacts 59 and 61 will be closed and the table 8 will be moved in the opposite direction until the light beam again rests equally on cells 36 and 37. In this way it will be seen that the table 8 will be shifted to bring the selenium cells 36 and 37 to a position where the light beam 41 will fall equally on the cells, and accordingly the position of the table 8 will follow the movement of the light beam and the deflections of the galvanometer 1.

As the table 8 is shifted from its normal position, friction driving wheel 24 will be moved off the center of the driving disk 25. As the wheel 24 moves off the center of wheel disk 25 it will be driven at a speed and in a direction that will vary with the extent and direction of movement respectively from the center of the disk 25. Rotation of disk 24 drives the bevel gear 20 which in turn drives pulley 12 and belt 13 through bevel gear 19, shaft 17, worm gear 16, and worm wheel 15. It will accordingly be noted that the disk 24 and the parts driven thereby including the ribbon 13, will remain at rest so long as the parts are in normal position, but upon deviation from normal position these parts will be driven at a rate that will vary with the extent of deviation from the normal condition and in a direction that will vary with the direction of deviation from the normal condition. It will be obvious to those skilled in the art that the ribbon 13 may be the pen or printing hammer carrying ribbon of a well known type of recorder mechanism.

As will be evident from a description of the construction of the particular embodiment of the invention herein disclosed, it may be used either in a manner corresponding to that of the operation of a millivoltmeter or in a manner corresponding to that of the operation of a potentiometer. If the motor 31, the disc 25, the disc 24, the driving connections between disc 24 and shaft 9 and the pulley wheel 12 be omitted, the device will then operate as a millivoltmeter. Such operation would be as follows:

A source casts a beam of light directed by the galvonometer 1, upon the selenium cells or other device sensitive to radiant energy. Deflection of the galvanometer 1 causes a shifting of the light falling upon the selenium cells resulting in a flow of current through the relay associated with contacts 59, 60 and 61, causing a circuit to be closed at said contacts to set reversible motor 35 into operation, which moves the table 8 and the selenium cells to follow the beam of light, the movement continuing until the radiant energy sensitive device occupies the same position relative to the beam of light as before; thus the table 8 and the parts associated therewith form, in effect, a millivoltmeter pointer operated by auxiliary means to take up a position corresponding to the deflection of the galvanometer 1 through the action of the light beam. The control contacts 66, 67 and 68 may be actuated by such deflection of the table 8 to produce an appropriate control effect. Thus the position of the table 8 and contacts associated therewith, correspond to the deflection of the galvanometer 1.

Where it is desired to use this invention in the form of potentiometer, the pulley 12 and pulley band associated therewith, together with either driving mechanism consisting of parts 15, 16, 17, 19, 21, 25, 26, 29, 30 and 31, are employed. With such parts or their equivalent included in the mechanism of the particular embodiment of the invention herein disclosed, the mode of operation is as follows:

The deflections of the galvanometer 1 act through the light beam to cause movement of the table 8 and associated radiant energy device in the manner described in the previous paragraph. The movement of the table 8 causes the disc 24 to be shifted relative to the disc 25 so that the disc 24 takes up rotation from the disc 25, the direction of rotation and rate of rotation of the disc 24 being determined by the extent and direction of the displacement of the disc 24 relative to the center of the disc 25, a greater deflection producing a greater rotation. The disc 24 drives the band 13, which carries a potentiometer slide wire contact and may or may not carry a pen carriage and/or indicator, and/or control contacts. The adjustment of the potentiometer slide wire by the movement of the band 13 changes the constant of the measuring circuit associated with the galvanometer 1, thereby tending to return the deflecting member of the galvanometer 1 to its normal position. The resulting movement of the deflecting member of galvanometer 1 shifts the light beam and causes in a manner before described, the radiant energy device and table 8 to follow the light beam and return to a normal or neutral position of the instrument. Where the original deflection of the galvanometer 1 is of large extent, the movement of the disc 24 will correspondingly be large and accordingly the adjustment of the potentiometer slide wire and the return of the deflecting member of the galvanometer member 1 to neutral be correspondingly rapid. As the galvanometer deflecting member returns to neutral, the table 8 in following the beam of radiant energy moves the disc 24 toward the center of the disc 25 so that the rate of adjustment of the slide wire contact is changed at a rate graded according to the rate of approach of the instrument to neutral condition.

Inasmuch as the operation of the galvanometer 1, of the radiant energy sensitive measuring system, and of the drive for adjusting the table 8, is continuous rather than intermittent, it is obvious that the rate at which the galvanometer 1 operates may be slower than would be necessary if the operation of those parts of the instrument were intermittent, as is usually the case with instruments employing mechanical pointers; therefore, the period of the galvanometer 1 may be greater with a corresponding greater sensitivity. The slide wire contact carried by the band 13 is continuously adjusted to such a position as to tend to maintain the deflecting member of the galvanometer 1 in neutral position.

When it is desired to operate a control circuit with the mechanism, a control switching mechanism may obviously be actuated by the ribbon 13 such as shown in my copending application may be utilized, in a manner obvious to those skilled in the art, or a simple control arrangement may be provided by securing to the table 8 a contact brush 66 which, depending upon the direction of movement of table 8 from its normal position, will engage either contact 67 or 68 completing a control circuit between conductors 69 and 70 or 71. Conductors 69, 70 and 71 may control a suitable remote control mechanism to restore to normal the controlled condition to which coil 1 is responsive in the manner well known to those skilled in the art.

The mechanism may be applied to a temperature control system for a furnace by connecting conductors 2 and 3 of the galvanometer coil 1 as shown in Figure 3 to a potentiometer with slide wire operated by belt 13, and to a thermo-electric device, such for example a thermocouple, subjected to the furnace temperature it is desired to control. Ribbon 13 may actuate a recording pen to make a record of the temperature variations, and selective switching mechanism to control the supply of heat energy to the furnace, or the furnace control may be actuated by a switching mechanism controlled by the conductors 69, 70 and 71. When the pen carried by belt 13 shows the temperature of the thermocouple, the parts assume the position shown in the drawings. When a deviation of the temperature occurs, the galvanometer 1 will be deflected in a direction and to an extent depending upon the direction and extent of deviation of the temperature. The deflection of the galvanometer 1 causes the movement of table 8 in a direction corresponding thereto as above set forth, and will cause the driving of ribbon 13 to shift the pen carried thereby and will at the same time move the slide wire contact until the potentiometer is again balanced and the pen position shows the correct temperature.

Instead of driving the ribbon 13 by means of the drive disk 24 and friction disk 25, it will be obvious to those skilled in the art that this mechanism may be eliminated and the ribbon 13 may be driven by an independent gear train from reversing motor 35, or by securing the table 8 rigidly to the spindle 9 so that pulley 12 will be turned with the table 8 by the reversing motor.

It will be apparent to those skilled in the art that the mechanism disclosed is applicable to a wide range of uses, and the details thereof may be widely varied without departing from the spirit of my invention. For example, stops 6 and parts 37 and 38 may be stationary, and extension 7 of movable arm 8 may be attached to control springs 1A and 1B to vary the torque of these springs to maintain coil 1 and mirror in the same normal position necessary to direct radiant energy upon sensitive elements 37.

While the particular embodiment of the invention has been described by way of illustration, it is not intended so to limit the invention; for example, the source of radiant energy may be other than a source of light, and the radiant energy may be other than the beam of light. Any form of electromagnetic radiation may be used. The means operating to direct the beam of radiant energy may be other than a mirror as specifically disclosed. In the case of light radiation, the directing means may be any convenient form of optical system. The means for detecting or responding to the beam of radiant energy may be other than selenium cells such for instance as thermocouples, bolometers, photoelectric cells, etc., arranged in an operating circuit characteristic of the particular radiant energy sensitive device. The form of relay actuated by the radiant energy sensitive device and the driving mechanism for adjusting the position of the radiant energy sensitive device, may be of a large variety as apparent to those skilled in the art.

Having described the preferred embodiments only of my invention, what is desired to be secured by Letters Patent and claimed as new is:

1. In combination, a galvanometer, a source of light projecting a beam of light, a member carried by said galvanometer, for directing said beam, light sensitive means responsive to said beam, and means operable by said light sensitive means tending to maintain said light sensitive means in the path of said beam.

2. The combination as set forth in claim 1, together with a recording mechanism actuated by said last mentioned means.

3. The combination as set forth in claim 1, together with control mechanism for said galvanometer actuated by said last mentioned means.

4. The combination as set forth in claim 1, together with control mechanism operated at a rate and in a direction that varies with the extent and direction of deviation of said galvanometer from normal position.

5. In combination, a source of directed radiant energy, a deflecting member operating to modify the path of the directed radiant energy, a member sensitive to said radiant energy, and means for adjusting the position of the last mentioned member in response to changes in the path of the radiant energy.

6. The combination as set forth in claim 5, together with control mechanism operated in accordance with the extent and direction of departure of said light sensitive element from a normal position.

7. The combination as set forth in claim 5, together with control mechanism variably operated in accordance with the direction and extent of deviation of said deflecting member from a normal position.

8. A galvanometer including a deflecting member, light sensitive means, a source of light normally impinging a beam of light on said light sensitive means by said deflecting member, and means operated by movement of the light beam relative to the light sensitive means tending to move said light sensitive means into the path of said beam of light.

9. In combination, a source of light projecting a beam of light, light sensitive means in the path of said beam of light, means for deflecting said beam of light from its normal path and means for moving said light sensitive device into the path of said beam of light.

10. In combination, a source of light projecting a beam of light, a light sensitive device normally in the path of the beam of light, means for deflecting said beam of light from said light sensitive device, and means controlled by said light sensitive device for moving said device back to the path of said beam of light.

11. In combination, a source of light projecting a beam of light, a light sensitive device in the path of the beam of light, means for deflecting said beam of light from said light sensitive device, means controlled by said light sensitive device for moving said device back to the path of said beam of light, and control means operated in accordance with the movements of said light sensitive device.

12. In a control system, a galvanometer, including a deflecting member, means for deflecting said member, means for positively limiting the extent of deflection of said deflecting member and means responsive to the deflection of said deflecting member for simultaneously effecting a control action and for shifting said limit of deflection of said deflecting member.

13. In a control system, a galvanometer including a deflecting member, means for normally balancing said galvanometer, radiant energy responsive means for unbalancing said galvanometer for operating its deflecting member, means responsive to the operation of said deflecting member tending to again balance said galvanometer and means simultaneously operative for effecting a control action.

14. In a control system, a galvanometer including a deflecting member radiant energy responsive means tending to normally balance said galvanometer, means for unbalancing said galvanometer to operate said deflecting member, control apparatus operated in response to the deflection of said deflecting member for effecting a control action and for simultaneously balancing said galvanometer.

15. In a control system, means responsive to temperature variations from a predetermined temperature for varying the supply of fuel for maintaining said predetermined temperature, radiant energy responsive means for rendering said last mentioned means unresponsive while continuing to vary the supply of fuel for again obtaining said predetermined condition, and means whereby said change of fuel supply is stopped only when the temperature has attained the predetermined value.

16. In a control system, a galvanometer responsive to temperature variations, control apparatus operated under control of said galvanometer for varying fuel supply to control said temperature and radiant energy responsive means simultaneously operative with the control apparatus for rendering the control apparatus inoperative for further variations of said fuel supply.

17. In combination, a source of light, a light deflecting member adjustable into different positions and receiving light from said source and deflecting it in a direction varying with the position of said member, apparatus receiving light deflected by said member and comprising two light sensitive devices normally in position relative to the path of the light coming to said apparatus to respectively receive definitely proportional portions of the light deflected by said member and adjusting means actuated by said devices to effect compensating adjustments in the positions of said devices relative to said path on a change in said relative positions resulting from a change in the position of said member.

18. In combination, a source of light, a light-deflecting member adjustable into different positions and receiving light from said source and deflecting it in a direction varying with the position of said member, apparatus receiving light deflected by said member and comprising a sensitive device normally in a position relative to the path of the light coming to said apparatus to receive a definite portion of the light deflected by said member and adjusting means actuated by said device to effect a compensating adjustment of the position of said device relative to said path on a change in said relative position resulting from a change in the position of said member.

In testimony whereof I affix my signature.

THOMAS RANDOLPH HARRISON.